(12) United States Patent
DiCroce

(10) Patent No.: US 7,653,463 B2
(45) Date of Patent: Jan. 26, 2010

(54) MULTI-RANGE REMOTE TRANSMITTER FOR A VEHICLE

(75) Inventor: John DiCroce, Oceanside, NY (US)

(73) Assignee: Audiovox Corporation, Hauppauge, NY (US)

( * ) Notice: Subject to any disclaimer, the term of this patent is extended or adjusted under 35 U.S.C. 154(b) by 337 days.

(21) Appl. No.: 11/679,405

(22) Filed: Feb. 27, 2007

(65) Prior Publication Data

US 2008/0221742 A1 Sep. 11, 2008

(51) Int. Cl.
*G05D 1/00* (2006.01)
(52) U.S. Cl. .................. 701/2; 340/5.72; 340/5.64
(58) Field of Classification Search ............ 701/2; 340/5.72, 5.64
See application file for complete search history.

(56) References Cited

U.S. PATENT DOCUMENTS

| | | | |
|---|---|---|---|
| 5,650,774 A | 7/1997 | Drori | |
| 6,285,296 B1 | 9/2001 | Christie | |
| 6,573,838 B2 * | 6/2003 | Christie | 340/825.69 |
| 6,998,958 B2 * | 2/2006 | Asakura et al. | 340/5.61 |
| 7,145,495 B2 | 12/2006 | Cooper | |
| 2001/0038328 A1 * | 11/2001 | King et al. | 340/5.64 |
| 2003/0193404 A1 | 10/2003 | Joao | |
| 2006/0145811 A1 * | 7/2006 | Nantz et al. | 340/5.72 |
| 2007/0200669 A1 * | 8/2007 | McBride et al. | 340/5.72 |

OTHER PUBLICATIONS

International Search Report dated Jul. 23, 2008 in corresponding International Application No. PCT/US08/53913.

* cited by examiner

*Primary Examiner*—Mark Hellner
(74) *Attorney, Agent, or Firm*—F. Chau & Associates, LLC

(57) ABSTRACT

A remote transmitter, including: an input unit configured to receive programming inputs and function inputs, wherein the programming inputs identify a first function to be transmitted in a first range of the transmitter when a first input of the input unit is selected and a second function to be transmitted in a second range of the transmitter when a second input of the input unit is selected, wherein the function inputs select the first input and the second input; a processor configured to output a first signal along a first path and a second signal along a second path in response to the first and second function inputs, respectively, wherein the first signal corresponds to the first function and the second signal corresponds to the second function; and an output configured to transmit the first signal in the first range and the second signal in the second range, wherein the first range is smaller than the second range.

23 Claims, 3 Drawing Sheets

MULTI-RANGE REMOTE TRANSMITTER FOR A VEHICLE

BACKGROUND OF THE INVENTION

1. Technical Field

The present invention relates to vehicular remote transmitters, and more particularly, to a multi-range remote transmitter for a vehicle.

2. Discussion of the Related Art

Vehicular remote transmitters are generally used to instruct a vehicle to perform security, keyless entry and/or remote start related functions. These transmitters typically transmit all commands at a fixed power level that corresponds to a receiving range of a vehicle control system. For example, a remote transmitter for use with a remote start system can transmit command signals that are capable of being received by the remote start system at distances of more than 1000 feet from the remote transmitter.

Although such long distances are convenient for functions such as remote start or door lock, they can be inconvenient, in some instances, for functions such as door unlock, window down or trunk release. For example, if an operator were to inadvertently activate a trunk release button on their remote transmitter when the operator is at or near the transmitter's maximum operating range, if alerted to this fact, the operator would have to walk the entire distance back to their car to close the car's trunk. If not alerted, the operator would not know that the car's trunk released, thus leaving the contents of the trunk susceptible to theft.

Accordingly, there exists a need for a remote transmitter that is capable of preventing certain vehicle functions from being executed at or near the remote transmitter's maximum operating range.

SUMMARY OF THE INVENTION

In an exemplary embodiment of the present invention, a remote transmitter, comprises: an input unit configured to receive programming inputs and function inputs, wherein the programming inputs identify a first function to be transmitted in a first transmission range of the remote transmitter when a first input of the input unit is selected and a second function to be transmitted in a second transmission range of the remote transmitter when a second input of the input unit is selected, wherein the function inputs select the first input to transmit the first function in the first transmission range and the second input to transmit the second function in the second transmission range; a processor configured to output a first signal along a first path and a second signal along a second path in response to the first and second function inputs, respectively, wherein the first signal corresponds to the first function and the second signal corresponds to the second function; and an output configured to transmit the first signal in the first transmission range and the second signal in the second transmission range, wherein the first transmission range is smaller than the second transmission range.

The first function is vehicle door unlock, vehicle trunk release, vehicle window down, garage door open, home door unlock or office door unlock. The second function is vehicle remote start, vehicle door lock, vehicle panic, garage door close, home door lock or office door lock.

The first path includes a limiter configured to limit an area of signal transmission for the first transmission range. The limiter is a resistor.

The remote transmitter further comprises a light emitting element configured to indicate that the signals transmitted from the output are in the first transmission range or in the second transmission range.

The first input is a button, switch, scroll wheel or touch screen icon. The second input is a button, switch, scroll wheel or touch screen icon.

The programming inputs are received during a programming mode of the remote transmitter. The programming mode is initiated by inputting a predetermined code to the input unit.

In an exemplary embodiment of the present invention, a vehicle control system, comprises: a remote transmitter, including: an input unit configured to receive programming inputs and function inputs, wherein the programming inputs identify a first vehicle function to be transmitted in a first transmission range of the remote transmitter when a first input of the input unit is selected and a second vehicle function to be transmitted in a second transmission range of the remote transmitter when a second input of the input unit is selected, wherein the function inputs select the first input to transmit the first vehicle function in the first transmission range and the second input to transmit the second vehicle function in the second transmission range; a processor configured to output a first signal along a first path and a second signal along a second path in response to the first and second function inputs, respectively, wherein the first signal corresponds to the first vehicle function and the second signal corresponds to the second vehicle function; and an output configured to transmit the first signal in the first transmission range and the second signal in the second transmission range, wherein the first transmission range is smaller than the second transmission range; and a receiver located in a vehicle and connected to a vehicle control module, the receiver configured to receive the first signal when the vehicle is in the first transmission range and the second signal when the vehicle is in the second transmission range.

The vehicle control module instructs a vehicle component to perform the first vehicle function associated with the first signal and a vehicle component to perform the second vehicle function associated with the second signal. The first vehicle function is door unlock, trunk release or window down and the second vehicle function is remote start, door lock or panic.

The vehicle control module communicates with the vehicle components via a vehicle data bus, a hardwired connection or both.

In an exemplary embodiment of the present invention, a method for operating a vehicle control system, comprises: receiving, at an input unit of a remote transmitter, programming inputs, wherein the programming inputs identify a first vehicle function to be transmitted in a first transmission range of the remote transmitter when a first input of the input unit is selected and a second vehicle function to be transmitted in a second transmission range of the remote transmitter when a second input of the input unit is selected; receiving, at the input unit, function inputs, wherein the function inputs select the first input to transmit the first vehicle function in the first transmission range and the second input to transmit the second vehicle function in the second transmission range; outputting, from a processor of the remote transmitter, a first signal along a first path and a second signal along a second path in response to the first and second function inputs, respectively, wherein the first signal corresponds to the first vehicle function and the second signal corresponds to the second vehicle function; transmitting, from an output of the remote transmitter, the first signal in the first transmission range and the second signal in the second transmission range, wherein the first transmission range is smaller than the second transmission range; and receiving, at a receiver connected to a vehicle control module, the first signal when a vehicle in which the vehicle control module is installed is in the first transmission range and the second signal when the vehicle is in the second transmission range.

The method further comprises instructing, at the vehicle control module, a component of the vehicle to perform the first vehicle function associated with the first signal and a component of the vehicle to perform the second vehicle function associated with the second signal.

The first vehicle function is door unlock, trunk release or window down and the second vehicle function is remote start, door lock or panic.

The method further comprises indicating, with a light emitting element of the remote transmitter, that the signals transmitted from the output are in the first transmission range or in the second transmission range.

The method further comprises initiating a programming mode of the remote transmitter by inputting a predetermined code to the input unit, wherein the programming inputs are received during the programming mode.

In an exemplary embodiment of the present invention, a remote programming and transmission method, comprises: receiving, at an input unit of a remote transmitter, programming inputs, wherein the programming inputs identify a first function to be transmitted in a first transmission range of the remote transmitter when a first input of the input unit is selected and a second function to be transmitted in a second transmission range of the remote transmitter when a second input of the input unit is selected, receiving, at the input unit, function inputs, wherein the function inputs select the first input to transmit the first function in the first transmission range and the second input to transmit the second function in the second transmission range; outputting, from a processor of the remote transmitter, a first signal along a first path and a second signal along a second path in response to the first and second function inputs, respectively, wherein the first signal corresponds to the first function and the second signal corresponds to the second function; and transmitting, from an output of the remote transmitter, the first signal in the first transmission range and the second signal in the second transmission range, wherein the first transmission range is smaller than the second transmission range.

The first function is vehicle door unlock, vehicle trunk release, vehicle window down, garage door open, home door unlock or office door unlock. The second function is vehicle remote start, vehicle door lock, vehicle panic, garage door close, home door lock or office door lock.

In an exemplary embodiment of the present invention, a remote transmitter, comprises: an input unit configured to receive a programming input and function inputs, wherein when first and second inputs of the input unit are pre-programmed to transmit functions in a second transmission range of the remote transmitter when either of the first and second inputs are selected, the programming input identifies a function to be transmitted in a first transmission range of the remote transmitter when the first input is selected, wherein the function inputs select the first input to transmit the function in the first transmission range and the second input to transmit the function in the second transmission range; a processor configured to output first and second signals along a path in response to the first and second function inputs, respectively, wherein the first signal corresponds to the function to be transmitted in the first transmission range and the second signal corresponds to the function to be transmitted in the second transmission range; and an output configured to transmit the first signal in the first transmission range and the second signal in the second transmission range, wherein the first transmission range is smaller than the second transmission range.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
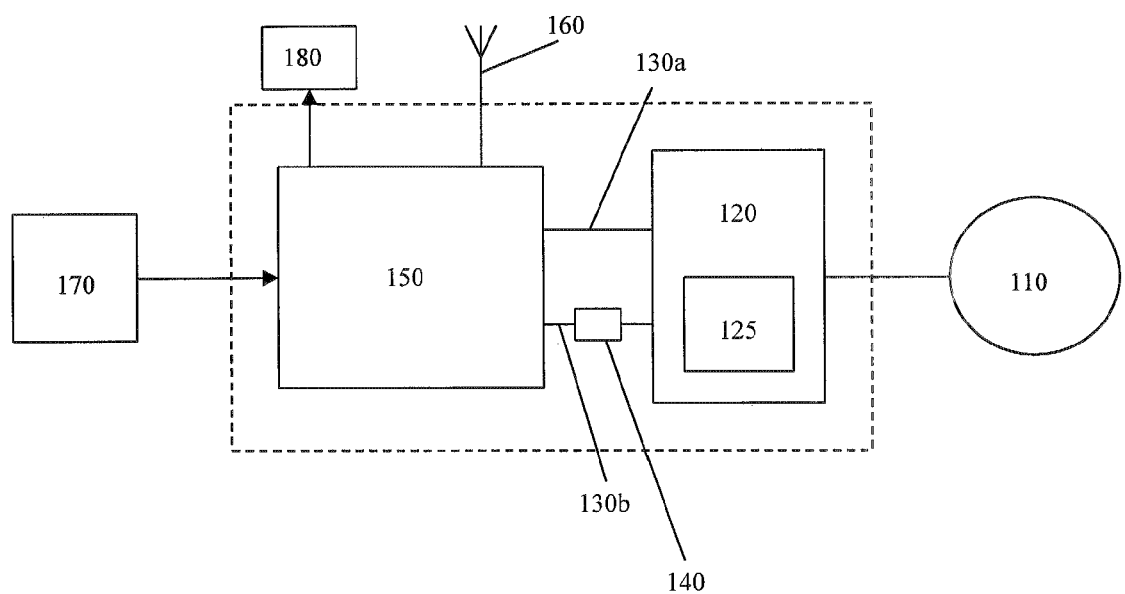
FIG. 1 is a block diagram of a multi-range remote transmitter for a vehicle according to an exemplary embodiment of the present invention.

FIG. 1 is a block diagram of a multi-range remote transmitter for a vehicle according to an exemplary embodiment of the present invention.

In FIG. 1, a remote transmitter 100 includes an input unit 110, a processor 120 including a memory 125, a transceiver 150 including an antenna 160, a pair of signal lines 130a and 130b connected between the processor 120 and the transceiver 150, a resistive load 140 located on the signal line 130b, a power source 170 and a light emitting element 180.

The input unit 110 is made up, for example, of one or more push buttons, switches, scroll wheels or icons on a touch screen interface, either alone or in combination. The memory 125 is, for example, an electrically erasable programmable read only memory (EEPROM). The transceiver 150 is capable of transmitting and receiving wireless signals via a number of communication schemes such as, but not limited to, radio frequency (RF), ZigBee, Near Field Communication (NFC), Bluetooth, ultra-wide band or infrared. The resistive load 140 is, for example, a resistor. The power source 170 is, for example, a battery. The light emitting element 180 is, for example, a light emitting diode (LED) or a portion of a screen interface.

When operated, the remote transmitter 100 receives transmitter programming inputs and vehicle function inputs from an operator via the input unit 110. An example of this will now be described with reference to FIGS. 1 and 2.

The transmitter programming inputs identify, for example, which button(s) of the input unit 110 can transmit signals to a vehicle 210a in a first transmission range 220a of the remote transmitter 100 and which button(s) of the input unit 110 can transmit signals to a vehicle 210b in a second transmission range 220b of the remote transmitter 100. The transmitter programming inputs further identify which vehicle functions are to be transmitted when the button(s) for transmitting signals in the first transmission range 220a are pressed and which vehicle functions are to be transmitted when the button(s) for transmitting signals in the second transmission range 220b are pressed. Once the transmitter programming inputs have been entered, they are sent to the processor 120 and stored in the memory 125.

It is to be understood that the vehicle functions to be transmitted in the first transmission range 220a are security signals such as door unlock, trunk release or window down, etc., and that the vehicle functions to be transmitted in the second transmission range 220b are convenience signals such as remote start, door lock or panic, etc.

In addition, non-vehicle functions can be programmed into the remote transmitter 100 to be transmitted in a first or second transmission range with relation to a home or office. For example, non-vehicle security functions such as garage door open, home door unlock or office door unlock can be transmitted to a garage door interface, home or office security system in a first transmission range, while non-vehicle convenience functions such as garage door close, home door lock or office door lock can be transmitted to a garage door interface, home or office security system in a second transmission range.

It is to be further understood that all the buttons of the input unit 110 can be pre-programmed to transmit all signals in the second transmission range 220b. In this case, the transmitter programming inputs need only identify which buttons of the input unit 110 can transmit signals in the first transmission range 220a.

It should also be understood that although two signal lines 130a and 130b have been shown in FIG. 1, additional signal lines can be located between the processor 120 and the transceiver 150. These additional signal lines can be configured such that they correspond, for example, to each button on the remote transmitter 100. In this configuration, more than one resistive load can be located as necessary on more than one of the signal lines.

The vehicle function inputs are selections made by the operator indicating a desired vehicle function to be transmitted to and subsequently performed by a vehicle. The vehicle function selections are made, for example, when the operator presses a button on the input unit 110 that corresponds to the desired vehicle function. Once the vehicle function inputs have been entered, they are sent to the processor 120. The processor 120 then determines which of the signal lines 130a and b is to be used as an output path for an internal signal corresponding to the desired vehicle function. This is done, for example, on the basis of which button was pressed. Thus, if the first button were pressed, since the stored transmitter programming inputs indicate that when the first button is pressed the vehicle function associated with the first button is to be transmitted in the first transmission range 220a, the internal signal is output to the signal line 130b.

By outputting the internal signal to the signal line 130b, the remote transmitter 100 reduces the power of a signal to be transmitted by the remote transmitter 100, since the resistive load 140 reduces the power supplied over the signal line 130b to the transceiver 150 that drives the antenna 160. When the power supplied to the transceiver 150 is reduced, the transmission range of the transceiver 150 is limited to the first transmission range 220a, which, for example, may be about 30 feet. In the alternative, when an internal signal is output to the signal line 130a, the power supplied over the signal line 130a is not reduced and the power of a signal to be transmitted by the remote transmitter 100 is not reduced. Therefore, the transmission range of the remote transmitter 100 may be, for example, about 1000 feet.

Figure 3:
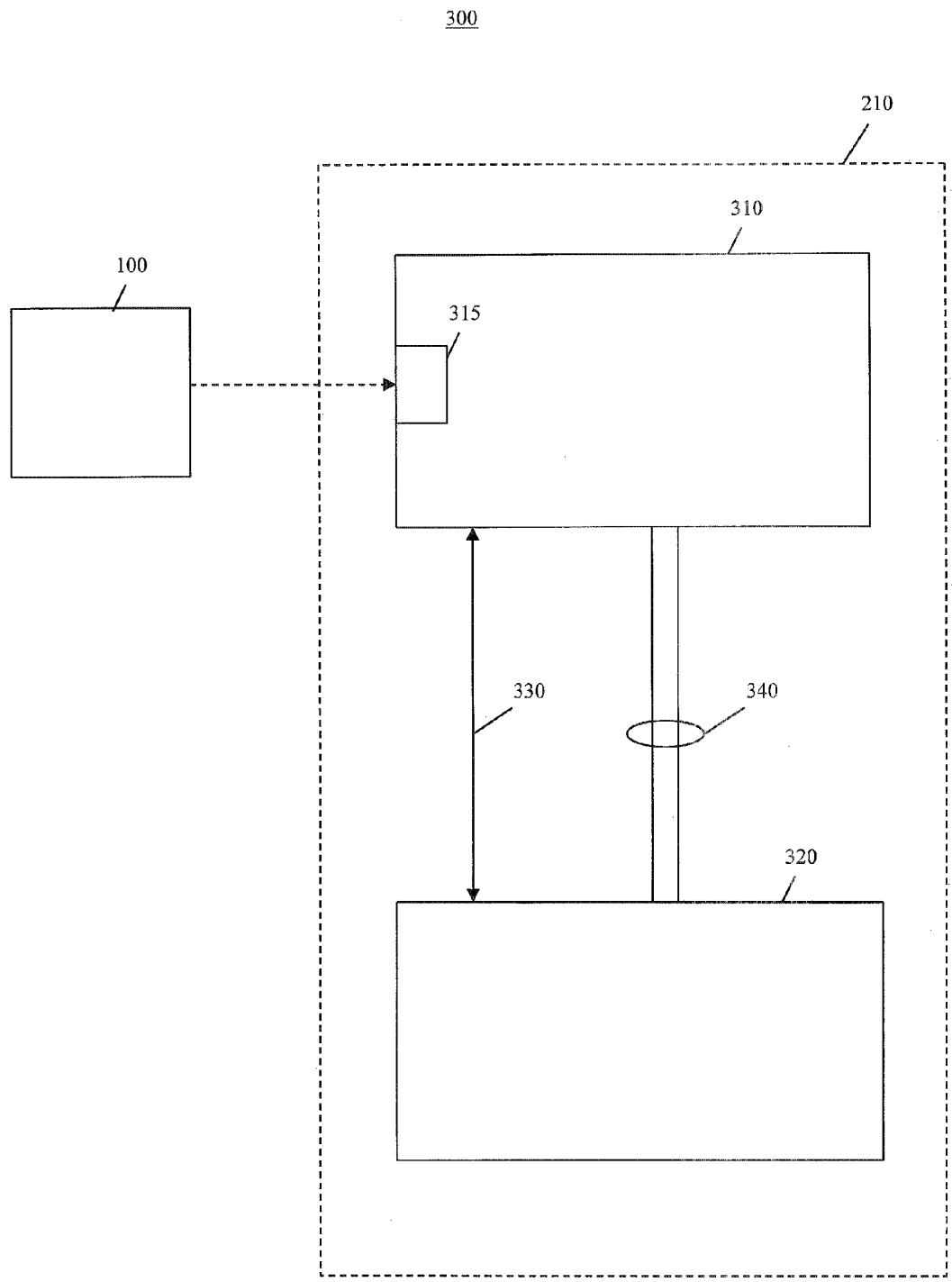
FIG. 3 is a block diagram of a vehicle control system according to an exemplary embodiment of the present invention.

FIG. 3 is a block diagram of a vehicle control system according to an exemplary embodiment of the present invention.

Figure 2:
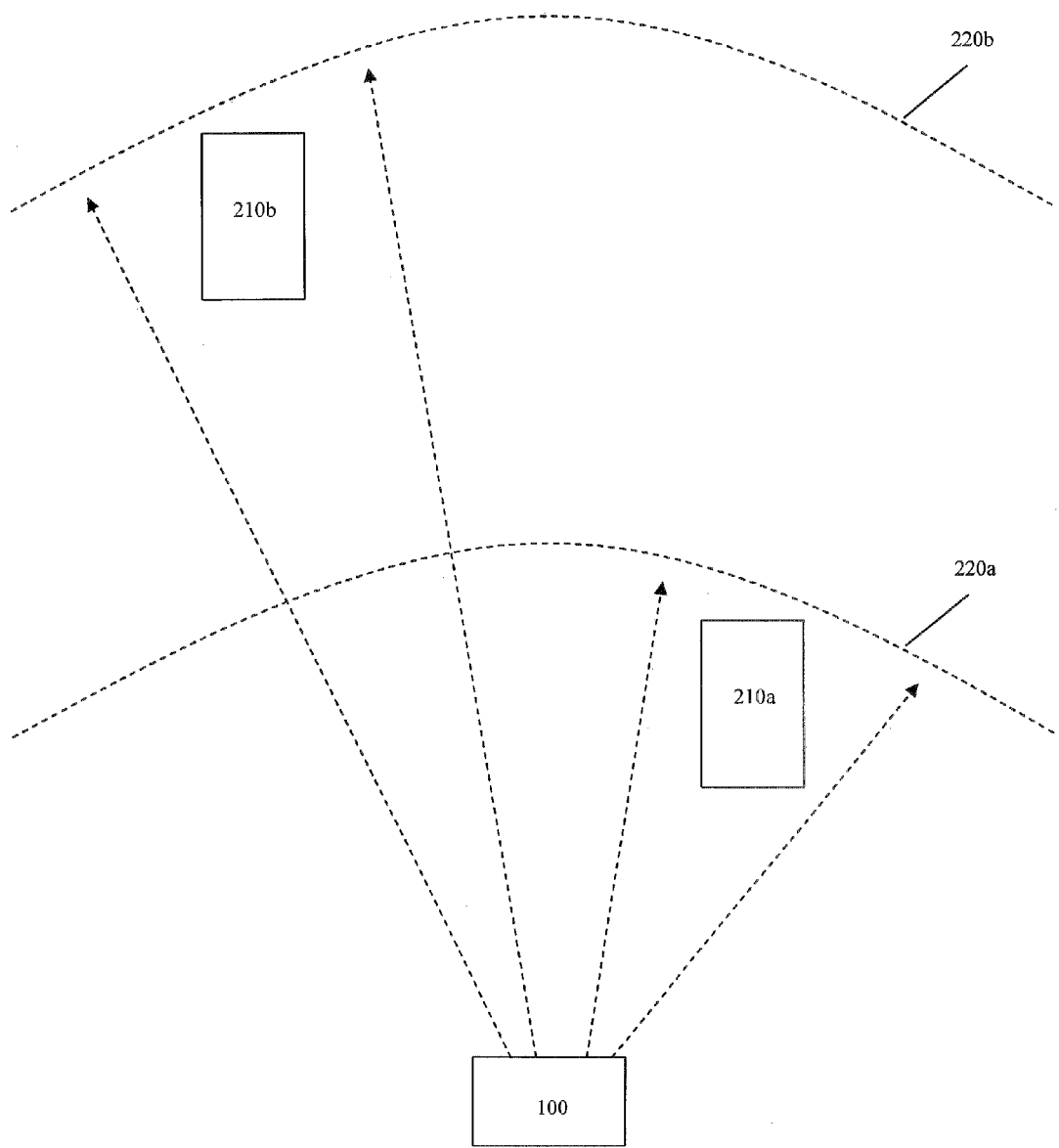
FIG. 2 is a plan view of first and second transmission ranges of the multi-range remote transmitter of FIG. 1.

In FIG. 3, a vehicle control system 300 includes the remote transmitter 100 as shown in FIG. 1 and a vehicle 210, which may be one of the vehicles 210a and 210b shown in FIG. 2. The vehicle 210 includes a vehicle control module 310 that can be installed in the vehicle 210 when the vehicle 210 is manufactured or installed in the vehicle 210 after the vehicle 210 is manufactured as an aftermarket product. The vehicle control module 310 can be a stand-alone control module or an interface module that interfaces with an existing vehicle control module. The vehicle control module 310 is capable of instructing the vehicle 210 to perform security, keyless entry and/or remote start related functions.

The vehicle control module 310 is hardwired to the vehicle 210 via power, ground and/or ignition connections and communicates with vehicle components 320 such as dome light, doors, hood, trunk, memory seat, defrost, heated seats, etc., via a vehicle data bus 330 such as a controller area network (CAN) data bus. The vehicle control module 310 can also communicate with vehicle components 320 via hardwired connections 340 between the vehicle control module 310 and the vehicle components 320. The vehicle control module 310 includes a transceiver 315 that is capable of transmitting and receiving wireless signals via a number of communication schemes such as, but not limited to, RF, ZigBee, NFC, Bluetooth, ultra-wide band or infrared.

An example operation of the vehicle control system 300 will now be described with reference to FIGS. 1 to 3.

In this example, an operator programs the remote transmitter 100 so that a first button of the input unit 110 can be used to transmit only a door unlock signal in the first transmission range 220a and so that a second button of the input unit 110 can be used to transmit only a door lock signal in the second transmission range 220b.

It is to be understood that the remote transmitter 110 is programmed when it is in a programming and/or learning mode. The programming mode can be initiated, for example, when a predetermined code such as a combination of button presses not common during a normal mode is input to the input unit 110 or when a programming switch is turned on.

It is to be further understood that in addition to being programmed directly by the operator, the remote transmitter 100 can be programmed via a wired connection such as a USB port or via a wireless connection such as its transceiver 150 by using, for example, a laptop or a Blackberry.

Once the remote transmitter 100 has been programmed, the operator can press, for example, the first button to transmit the door unlock signal to the vehicle 210a in the first transmission range 220a. At this time, the remote transmitter's light emitting element 180 can be illuminated to indicate that the remote transmitter 100 is in a short-range transmission mode (e.g., it only transmits signals to vehicles located in the first transmission range 220a). The light emitting element 180 can also be illuminated when the remote transmitter 100 is in a long-range transmission mode (e.g., it transmits signals to vehicles located in both the first transmission range 220a and the second transmission range 220b).

Since the operator is transmitting the door lock signal to the vehicle 210a in the first transmission range 220a, the transceiver 315 of the vehicle control module 310 receives the signal transmitted by the remote transmitter 100, and then, the vehicle control module 310 instructs a door of the vehicle 210a to be unlocked. Because the door unlock signal is only transmitted in the first transmission range 220a, there is no chance of unlocking a door of the vehicle 210b in the second transmission range 220b; thus, providing greater security to the operator while increasing the battery life of the remote transmitter 100.

In accordance with an exemplary embodiment of the present invention, a remote transmitter is provided that offers a selective low power level output for certain buttons and a selective high power level output for other buttons. The low power level buttons are to be used for vehicle security features such as door unlock, trunk release or window down and the high power level buttons are to be used for vehicle convenience features such as remote start, door lock or panic. In doing so, an operator of the remote transmitter cannot, for example, inadvertently unlock the trunk or a door of their vehicle when the operator is at or near the transmitter's maximum operating range.

It is further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A remote transmitter, comprising:
   an input unit configured to receive programming inputs and function inputs, wherein the programming inputs identify a first function to be transmitted in a first transmission range of the remote transmitter when a first input of the input unit is selected and a second function to be transmitted in a second transmission range of the remote transmitter when a second input of the input unit is selected, wherein the function inputs select the first input to transmit the first function in the first transmission range and the second input to transmit the second function in the second transmission range;
   a processor configured to output a first signal along a first path and a second signal along a second path in response to the first and second function inputs, respectively, wherein the first signal corresponds to the first function and the second signal corresponds to the second function; and
   an output configured to transmit the first signal in the first transmission range and the second signal in the second transmission range, wherein the first transmission range is smaller than the second transmission range.

2. The remote transmitter of claim 1, wherein the first function is vehicle door unlock, vehicle trunk release, vehicle window down, garage door open, home door unlock or office door unlock.

3. The remote transmitter of claim 1, wherein the second function is vehicle remote start, vehicle door lock, vehicle panic, garage door close, home door lock or office door lock.

4. The remote transmitter of claim 1, wherein the first path includes a limiter configured to limit an area of signal transmission for the first transmission range.

5. The remote transmitter of claim 4, wherein the limiter is a resistor.

6. The remote transmitter of claim 1, further comprising:
   a light emitting element configured to indicate that the signals transmitted from the output are in the first transmission range or in the second transmission range.

7. The remote transmitter of claim 1, wherein the first input is a button, switch, scroll wheel or touch screen icon.

8. The remote transmitter of claim 1, wherein the second input is a button, switch, scroll wheel or touch screen icon.

9. The remote transmitter of claim 1, wherein the programming inputs are received during a programming mode of the remote transmitter.

10. The remote transmitter of claim 9, wherein the programming mode is initiated by inputting a predetermined code to the input unit.

11. A vehicle control system, comprising:
    a remote transmitter, including:
    an input unit configured to receive programming inputs and function inputs, wherein the programming inputs identify a first vehicle function to be transmitted in a first transmission range of the remote transmitter when a first input of the input unit is selected and a second vehicle function to be transmitted in a second transmission range of the remote transmitter when a second input of the input unit is selected, wherein the function inputs select the first input to transmit the first vehicle function in the first transmission range and the second input to transmit the second vehicle function in the second transmission range;
    a processor configured to output a first signal along a first path and a second signal along a second path in response to the first and second function inputs, respectively, wherein the first signal corresponds to the first vehicle function and the second signal corresponds to the second vehicle function; and
    an output configured to transmit the first signal in the first transmission range and the second signal in the second transmission range, wherein the first transmission range is smaller than the second transmission range; and
    a receiver located in a vehicle and connected to a vehicle control module, the receiver configured to receive the first signal when the vehicle is in the first transmission range and the second signal when the vehicle is in the second transmission range.

12. The vehicle control system of claim 11, wherein the vehicle control module instructs a vehicle component to perform the first vehicle function associated with the first signal and a vehicle component to perform the second vehicle function associated with the second signal.

13. The vehicle control system of claim 11, wherein the first vehicle function is door unlock, trunk release or window down and the second vehicle function is remote start, door lock or panic.

14. The vehicle control system of claim 12, wherein the vehicle control module communicates with the vehicle components via a vehicle data bus, a hardwired connection or both.

15. A method for operating a vehicle control system, comprising:
  receiving, at an input unit of a remote transmitter, programming inputs, wherein the programming inputs identify a first vehicle function to be transmitted in a first transmission range of the remote transmitter when a first input of the input unit is selected and a second vehicle function to be transmitted in a second transmission range of the remote transmitter when a second input of the input unit is selected;
  receiving, at the input unit, function inputs, wherein the function inputs select the first input to transmit the first vehicle function in the first transmission range and the second input to transmit the second vehicle function in the second transmission range;
  outputting, from a processor of the remote transmitter, a first signal along a first path and a second signal along a second path in response to the first and second function inputs, respectively, wherein the first signal corresponds to the first vehicle function and the second signal corresponds to the second vehicle function;
  transmitting, from an output of the remote transmitter, the first signal in the first transmission range and the second signal in the second transmission range, wherein the first transmission range is smaller than the second transmission range; and
  receiving, at a receiver connected to a vehicle control module, the first signal when a vehicle in which the vehicle control module is installed is in the first transmission range and the second signal when the vehicle is in the second transmission range.

16. The method of claim 15, further comprising:
  instructing, at the vehicle control module, a component of the vehicle to perform the first vehicle function associated with the first signal and a component of the vehicle to perform the second vehicle function associated with the second signal.

17. The method of claim 15, wherein the first vehicle function is door unlock, trunk release or window down and the second vehicle function is remote start, door lock or panic.

18. The method of claim 15, further comprising:
  indicating, with a light emitting element of the remote transmitter, that the signals transmitted from the output are in the first transmission range or in the second transmission range.

19. The method of claim 15, further comprising:
  initiating a programming mode of the remote transmitter by inputting a predetermined code to the input unit, wherein the programming inputs are received during the programming mode.

20. A remote programming and transmission method, comprising:
  receiving, at an input unit of a remote transmitter, programming inputs, wherein the programming inputs identify a first function to be transmitted in a first transmission range of the remote transmitter when a first input of the input unit is selected and a second function to be transmitted in a second transmission range of the remote transmitter when a second input of the input unit is selected,
  receiving, at the input unit, function inputs, wherein the function inputs select the first input to transmit the first function in the first transmission range and the second input to transmit the second function in the second transmission range;
  outputting, from a processor of the remote transmitter, a first signal along a first path and a second signal along a second path in response to the first and second function inputs, respectively, wherein the first signal corresponds to the first function and the second signal corresponds to the second function; and
  transmitting, from an output of the remote transmitter, the first signal in the first transmission range and the second signal in the second transmission range, wherein the first transmission range is smaller than the second transmission range.

21. The method of claim 20, wherein the first function is vehicle door unlock, vehicle trunk release, vehicle window down, garage door open, home door unlock or office door unlock.

22. The method of claim 20, wherein the second function is vehicle remote start, vehicle door lock, vehicle panic, garage door close, home door lock or office door lock.

23. A remote transmitter, comprising:
  an input unit configured to receive a programming input and function inputs, wherein when first and second inputs of the input unit are pre-programmed to transmit functions in a second transmission range of the remote transmitter when either of the first and second inputs are selected, the programming input identifies a function to be transmitted in a first transmission range of the remote transmitter when the first input is selected, wherein the function inputs select the first input to transmit the function in the first transmission range and the second input to transmit the function in the second transmission range;
  a processor configured to output first and second signals along a path in response to the first and second function inputs, respectively, wherein the first signal corresponds to the function to be transmitted in the first transmission range and the second signal corresponds to the function to be transmitted in the second transmission range; and
  an output configured to transmit the first signal in the first transmission range and the second signal in the second transmission range, wherein the first transmission range is smaller than the second transmission range.

* * * * *